United States Patent
Vasconcellos et al.

(10) Patent No.: US 6,743,421 B2
(45) Date of Patent: Jun. 1, 2004

(54) METHOD FOR ODOR CONTROL

(75) Inventors: Stephen R. Vasconcellos, Doylestown, PA (US); Terry L. Robbins, Jamison, PA (US)

(73) Assignee: GE Betz, Inc., Trevose, PA (US)

( * ) Notice: Subject to any disclaimer, the term of this patent is extended or adjusted under 35 U.S.C. 154(b) by 105 days.

(21) Appl. No.: 10/061,463

(22) Filed: Jan. 31, 2002

(65) Prior Publication Data

US 2003/0143182 A1 Jul. 31, 2003

(51) Int. Cl.[7] .................................................. A61L 9/00
(52) U.S. Cl. ................... 424/76.1; 424/76.2; 424/76.21
(58) Field of Search ............................. 424/76.1, 76.2, 424/76.21

(56) References Cited

U.S. PATENT DOCUMENTS

| | | | |
|---|---|---|---|
| 3,905,926 A | * | 9/1975 | D'Alelio ................. 424/76.1 |
| 3,989,810 A | | 11/1976 | Toyama et al. |
| 4,263,146 A | | 4/1981 | Wegmuller et al. |
| 4,405,354 A | | 9/1983 | Thomas, II et al. |
| 4,551,305 A | | 11/1985 | Nelson |
| 4,795,482 A | | 1/1989 | Gioffre et al. |
| 4,902,489 A | | 2/1990 | Watanabe |

FOREIGN PATENT DOCUMENTS

| | | |
|---|---|---|
| DE | 578186 | 6/1933 |
| EP | 0 369 056 | 11/1988 |
| JP | 55084539 | 8/1971 |

* cited by examiner

*Primary Examiner*—Shelley A. Dodson
(74) *Attorney, Agent, or Firm*—Steven D. Boyd

(57) ABSTRACT

The present invention relates to a method of removing organic acid an/or organic amines odors from aqueous systems by treating the aqueous system or the atmosphere adjacent to the aqueous system with a solution of a substantially sulfonate free, anionic kraft pine lignin.

12 Claims, No Drawings

METHOD FOR ODOR CONTROL

FIELD OF THE INVENTION

The present invention relates to the control of offensive odors. More particularly, the present invention relates to a method of controlling offensive organic and/or amine odors in a gaseous or liquid medium by contacting the medium with a kraft pine lignin.

BACKGROUND OF THE INVENTION

Objectionable odors in aqueous systems such as industrial aqueous systems can present both aesthetic and health concerns. For example the presence of organic materials particularly organic acids and amines such as organic amines can give rise to objectionable odors. The existence of such objectionable odors can be a problem aesthetically. For example, homes, schools, parks or businesses located near an industrial facility that emits organic acid or organic amine odors will find such odors objectionable. In addition, health issues may arise.

Odor control methods can be chemical or mechanical. Ventilation of indoor air is often employed. If the air is vented without treatment, the odoriferous air is simply diluted by the outside air so that the concentrations of odor causing chemicals are below the detection threshold. Alternatively, exhaust air may be treated with scrubbers, biofilters or absorption units. In scrubbers, the water employed may contain chemicals which increase the efficiency and/or react with the odor causing chemicals. For example, acid gases are often scrubbed with a caustic solution or a combination of caustic and sodium hypochlorite. In biofilters, a solid support is seeded with microbial cultures which degrade the odor causing chemicals. A variety of support and microbes are available for liquid and gaseous streams. Adsorption units typically contain some sort of solid sorbent such as activated carbon or other high surface area material. Other mechanical solutions to odor problems include electrostatic precipitators and combustion.

Many chemical treatments for odor control are masking agents. Masking agents can be applied as solids, liquids, or gases. Most of the essential oils (limonene, pinene etc.) and esters used for odor control may be considered masking agents. Masking agents do not actually react with the odor causing chemical but decrease the perception of the odor by overpowering it. Masking agents replace the objectionable odor with a more pleasing odor. Masking agents may exacerbate problems with odors that are health hazards by decreasing the perception of the odor without decreasing its toxicity. Often, the smell of a masking agent itself can become objectionable.

Odor neutralization is a phenomenon in which odors can seem to cancel each other. Rather than over powering an offensive odor with a more pleasing one of a masking agent, the aim of neutralization is to produce a net zero odor. In the process of neutralization, there is no chemical interaction between the odor causing chemical and the neutralizing agent. Like masking agents, they can exacerbate a problem if the odor that is neutralized is also toxic. Another disadvantage of neutralizing agents is that multi-component odors will typically require a multi-component blend of neutralizing chemicals. To completely neutralize complex odors, individual blends of neutralizing chemicals would need to be developed for each individual application.

Many chemicals can be used to react with offensive odors. For example U.S. Pat. No. 4,551,305 discloses a formulation for reducing organic waste odors which includes a spent sulfite liquor containing lignosulfonate and sugars, acetic acid, phenolic carbonyl and an alkaline pH-modifying substance. The combination is effective at reducing amine and ammonium odors. U.S. Pat. No. 4,902,489 discloses a method for deodorizing offensive gases comprising treatment with a lignin solution after washing the gas to remove basic offensive ingredients.

SUMMARY OF THE INVENTION

In general, the present invention relates to removing odor from an aqueous system by adding an effective dosage of a treatment agent to the aqueous system or spraying the treatment agent into the atmosphere near the aqueous system. The problematic odors controlled by the present invention can be a result of organic acids and/or organic amines. The odor control treatment of the present invention comprises an aqueous solution of kraft pine lignin. The kraft pine lignin is preferably anionic and substantially free of sulfonate. The treatment is preferably a salt form such as a sodium salt of anionic kraft pine lignin. By substantially sulfonate free, it is meant that sulfonate substitution of the kraft pine lignin is not intentionally provided. However, trace amounts of sulfonate may exist in the preferred anionic kraft pine lignin.

In accordance with the present invention, it has been found that kraft pine lignin is effective at controlling undesirable odor of aqueous systems which result from the presence of odoriferous organic acids and/or organic amines. The treatment of the present invention can be added directly to the aqueous system, added to components such as scrubbers that contact the aqueous system or sprayed into the atmosphere near the aqueous system. The odor control of the present invention is achieved by any means of bringing the kraft pine lignin into contact with the odoriferous component of the aqueous system.

DETAILED DESCRIPTION OF THE PREFERRED EMBODIMENT

The present invention involves controlling offensive odors from aqueous systems through the addition of a substantially sulfonate free, anionic kraft pine lignin to the aqueous system or the atmosphere near the aqueous system. Offensive odors such as odors caused by organic acids and/or organic amines can be controlled by the method of the present invention.

Typical organic acids and/or organic amines which can cause objectionable odors when present in aqueous systems include skatole (3-methyl 1-H indole), butyric acid, propionic acid, valeric acid, cadaverine(1,5 pentane diamine), putrescine (1,4 butanediamine), butylamine, propylamine and ammonia. These materials are known to result in objectionable odors in several industrial operations including meat processing, dairy processing, corn milling, paper processing and beet processing.

The treatment of the present invention is a substantially sulfonate free, anionic kraft pine lignin. Preferably the treatment is the sodium salt of substantially sulfonate free, anionic kraft pine lignin having a molecular weight of from about 1000 to 500,000 and most preferably having a molecular weight of about 50,000. The treatment is preferably provided as an aqueous solution of substantially sulfonate free, anionic kraft pine lignin having a concentration of from about 0.1% to about 30% actives. Such an aqueous solution of substantially sulfonate free, anionic kraft pine lignin preferably has a pH of from about 8 to 11. The aqueous treatment solution can be added to an odoriferous aqueous system in a concentration ranging from about 10 ppm to about 500 ppm. An exemplary material is Indulin C available from Westvaco Inc. Indulin C is a kraft pine lignin having a molecular weight of about 50,000 available as a brown powder of moisture content ranging from about 4–5%. Indulin C has a pH of about 10.2 in a 15% w/w aqueous solution.

The present invention will now be further described with reference to a number of specific examples which are to be regarded as illustrative and not as restricting the scope of the present invention. Unless otherwise indicated herein, all parts and percentages are by weight.

EXAMPLE 1

A wastewater sample from a beet processing plant was obtained. The wastewater had an amine based offensive odor. An odor jury was used to evaluate the effectiveness of the treatment being tested. A scale of 0–5 was used to evaluate odors with 0 being the least offensive and 5 being the most offensive. Testing was conducted by placing 200 ml aliquots of the wastewater in 400 ml flasks. Treatment agents where added to the flasks in concentrations ranging from 10–500 ppm, mixed for one minute and evaluated for odor. Table 1 summarizes the test results

TABLE I

| Treatment | Odor Rating (0–5): Beet Processing Plant Dosage (ppm) | | | | | |
|---|---|---|---|---|---|---|
| | 0 | 10 | 25 | 50 | 100 | 500 |
| A | 3 | 1.6 | 1.5 | 1.3 | 1.0 | 1.1 |
| B | 3 | 1.5 | 1.5 | 1.6 | 1.7 | 1.7 |
| C | 3 | 2 | 1.6 | 1.4 | 1.4 | 1.6 |
| D | 3 | 2.3 | 2 | 2 | 1.8 | 2.0 |

A = Indulin C a kraft pine lignin available from Westvaco Inc.
B = citric acid
C = a surfactant/lemon oil (masking agent) available as OC 2526 from BetzDearborn Inc.
D = a surfactant/organic ester blend (masking agent) available as OC 2529 from BetzDearborn Inc.

The data in Table I shows that the kraft pine lignin is effective at mitigating odors over the treatment ranges tested.

EXAMPLE 2

A wastewater sample from a corn mill processing plant was obtained. The wastewater had an offensive odor identified as an organic acid. The procedure described above in Example 1 was employed to test the odor control effectiveness of various lignin materials as well as commercial odor control treatment. Table II summarizes the results.

TABLE II

| Treatment | Odor Rating (0–5): Corn Mill Processing Plant Dosage (ppm) | | | | | |
|---|---|---|---|---|---|---|
| | 10 | 25 | 50 | 100 | 250 | 500 |
| A | 3.4 | 3 | 2.5 | 2.5 | 2 | 2 |
| E | 4 | 3.5 | 3.5 | 3 | 3.8 | 3.8 |
| F | 4 | 3.5 | 3.5 | 3.2 | 3 | 3 |
| G | 4 | 4 | 4 | 4 | 3.5 | 3.2 |
| C | 4 | 3.5 | 3.2 | 3 | 2.8 | 2.8 |
| D | 4 | 4 | 3.8 | 3.5 | 3 | 3 |
| H | 5 | 5 | 5 | 5 | 5 | 4.5 |

TABLE II-continued

| Treatment | Odor Rating (0–5): Corn Mill Processing Plant Dosage (ppm) | | | | | |
|---|---|---|---|---|---|---|
| | 10 | 25 | 50 | 100 | 250 | 500 |

Treatments A, C and D are as described above in Table I
E is a purified, nonionic pine lignin available as Indulin AT from Westvaco
F is a cationic pine lignin available as Indulin W-1 from Westvaco
G is functionalized lignin
H is triazine The data in Table II shows that the draft pine lignin (treatment A) is effective at mitigating organic immune odors over the treatment ranges tested.

While the present invention has been described with respect to particular embodiments thereof, it is apparent that numerous other forms and modifications of this invention will be obvious to those skilled in the art. The appended claims entered into this invention generally should be construed to cover all such obvious forms in modifications which are within the true spirit and scope of the present invention.

What is claimed is:

1. A method of deodorizing a odoriferous aqueous system containing odor causing organic acids and/or amine comprising adding to said system a substantially sulfonate free, anionic kraft pine lignin in an amount sufficient to deodorize said aqueous system.

2. The method of claim 1 wherein said substantially sulfonate free, anionic kraft pine lignin is added to said aqueous system as an aqueous solution.

3. The method of claim 2 wherein said aqueous solution has a substantially sulfonate free, anionic kraft pine lignin concentration of from about 0.1% to about 30%.

4. The method of claim 3 wherein said substantially sulfonate free, anionic kraft pine lignin aqueous solution is added to said aqueous system in a concentration from about 10 ppm to about 500 ppm.

5. The method of claim 2 wherein said substantially sulfonate free, anionic kraft pine lignin aqueous solution has a pH from about pH 8 to about pH 11.

6. The method of claim 1 wherein said substantially sulfonate free, anionic kraft pine lignin is a sodium salt of substantially sulfonate free, anionic kraft pine lignin.

7. The method of claim 1 wherein said substantially sulfonate free, anionic kraft pine lignin has a molecular weight of from about 25,000 to 75,000.

8. A method of deodorizing the odoriferous atmosphere of an aqueous system comprising spraying into said atmosphere an aqueous solution of a substantially sulfonate free, anionic kraft pine lignin.

9. The method of claim 8 wherein said aqueous solution has a substantially sulfonate free, anionic kraft pine lignin concentration of from about 0.1% to about 10%.

10. The method of claim 8 wherein said substantially sulfonate free, anionic kraft pine lignin solution has a pH of from about pH 8 to about pH 11.

11. The method of claim 8 wherein said substantially sulfonate free, anionic kraft pine lignin is a sodium salt of substantially sulfonate free, anionic kraft pine lignin.

12. The method of claim 8 wherein said substantially sulfonate free, anionic kraft pine lignin has a molecular weight of about 25,000 to about 75,000.

* * * * *